United States Patent
Lu et al.

(10) Patent No.: US 9,035,361 B2
(45) Date of Patent: *May 19, 2015

(54) ELECTROMIGRATION RESISTANT STANDARD CELL DEVICE

(71) Applicant: Taiwan Semiconductor Manufacturing Co., Ltd., Hsin-Chu (TW)

(72) Inventors: Lee-Chung Lu, Taipei (TW); Wen-Hao Chen, Hsin-Chu (TW); Yuan-Te Hou, Hsinchu (TW); Shen-Feng Chen, Hsinchu (TW); Meng-Fu You, Changhua (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,334

(22) Filed: Apr. 26, 2013

(65) Prior Publication Data

US 2013/0234212 A1    Sep. 12, 2013

Related U.S. Application Data

(63) Continuation of application No. 12/845,162, filed on Jul. 28, 2010, now Pat. No. 8,431,968.

(51) Int. Cl.
| | |
|---|---|
| *H01L 23/52* | (2006.01) |
| *H01L 27/10* | (2006.01) |
| *G06F 17/50* | (2006.01) |
| *H01L 23/528* | (2006.01) |

(52) U.S. Cl.
CPC ............ *H01L 27/10* (2013.01); *G06F 17/5036* (2013.01); *G06F 17/5072* (2013.01); *G06F 17/5077* (2013.01); *G06F 17/5081* (2013.01); *G06F 2217/82* (2013.01); *H01L 23/5286* (2013.01); *G06F 17/5045* (2013.01); *H01L 2924/0002* (2013.01)

(58) Field of Classification Search
CPC ............ G06F 17/5045; G06F 17/5068; G06F 17/5072; G06F 17/5036; G06F 17/5077; G06F 17/5081; H01L 23/5086; H01L 27/10
USPC .......................................... 257/211; 716/102
See application file for complete search history.

(56) References Cited

U.S. PATENT DOCUMENTS

| | | | |
|---|---|---|---|
| 5,440,153 A | 8/1995 | Male et al. | |
| 7,786,513 B2 | 8/2010 | Tsutsumi | |
| 8,068,349 B2 | 11/2011 | Wu et al. | |
| 2008/0048331 A1 | 2/2008 | Chen | |
| 2008/0222588 A1* | 9/2008 | Nonaka et al. | 716/10 |
| 2011/0024869 A1* | 2/2011 | Nakajima et al. | 257/499 |

\* cited by examiner

*Primary Examiner* — A. Sefer
(74) *Attorney, Agent, or Firm* — Duane Morris LLP

(57) ABSTRACT

A standard cell semiconductor integrated circuit device design provides a standard cell semiconductor device that includes first standard cells and user-defined target standard cells which consume more power or include other operational characteristics that differ from the operational characteristics of the first standard cells. The standard cells are routed to ground and power wires using one power rail and the target cells are routed to the ground and power lines using the first power rail and a second power rail to alleviate electromigration in either of the power rails. The two power rails include an upper power rail and a lower power rail. An intermediate conductive layer may be disposed between the upper and lower power rails to provide for signal routing by lateral interconnection between cells.

20 Claims, 4 Drawing Sheets

ELECTROMIGRATION RESISTANT STANDARD CELL DEVICE

RELATED APPLICATION

This is a continuation of U.S. patent application Ser. No. 12/845,162, filed Jul. 28, 2010 and set to issue on Apr. 30, 2013 as U.S. Pat. No. 8,431,968, the contents of which are herein incorporated by reference as if set forth in their entirety.

TECHNICAL FIELD

The present disclosure is related to standard cell semiconductor devices, their design and the layout of cells within such standard cell semiconductor devices.

BACKGROUND

Semiconductor integrated circuit devices are designed using various computer aided means to produce a logical circuit in which various functional elements are identified and interconnected to form particular logic functions. Computer-aided design (CAD) or other design tools are typically used to generate lithography data based on the design and the lithography data is used to form a photomask set that is used in the actual fabrication of the semiconductor integrated circuit (IC) devices.

A standard cell type semiconductor IC device is an application specific integrated circuit (ASIC) device designed using multiple standard cells. Each standard cell may include a group of transistor and interconnect structures that provide a boolean logic function (e.g., AND, OR, XOR, XNOR, invertors) or a storage function (flipflop or latch, for example). In a standard cell system, the standard cells are advantageously maintained in a library and various integrated circuit devices can be designed by selecting desired standard cells from the library and combining them in various arrangements to form a most suitable cell arrangement pattern that forms part of the layout of the integrated circuit device.

The design process for standard cell semiconductor IC devices includes constructing the integrated circuit design out of the selected standard cells that are connected together electrically, i.e. routed, using wire interconnects which are also used to route the cells to input and output terminals. The standard cells and connections between them may be stored in databases called "netlists" (i.e., lists of symbolic interconnections). The netlist describes the connectivity of the standard cells within the semiconductor IC device design. One or more computer-aided design (CAD) tools may be used to generate the netlist of the selected standard cells and the interconnections between the cells and input/output. The netlist may be used by a floor planner, placement tool, or other design tool, to place the selected cells at particular locations in the layout of a standard cell integrated circuit device.

The design of the standard cell semiconductor IC device may be carried out by an APR (automatic placement and routing) design tool that includes a placer and a router, by selecting standard cells from the library of standard cells and placing and routing the cells according to design instructions provided to the APR tool such as in the netlist. The placer determines the optimum location of each standard cell of the integrated circuit on the semiconductor substrate, and the router optimizes the routing of input/output lines and the connection between standard cells so that the integrated circuit layout does not become overly congested by input/output and other routing lines. Other CAD tools are also available and may be used in the design of standard cell semiconductor IC devices.

In addition to the standard cells that may be selected from a library, the device design may include other standard cells such as user specified target cells with different operational characteristics. When such target cells are used along with the standard cells from the library to form a standard cell semiconductor IC device, additional challenges in the placement and routing of the cells is imposed. Target cells that operate at higher power consumption levels, for example, require the routing wires used to couple the target cells to ground and power sources, to operate at high power levels and carrying high currents. As such, these wires are especially susceptible to electromigration (EM) failure and even complete blowout of the wire, thus representing a significant shortcoming of conventional technology.

BRIEF DESCRIPTION OF THE DRAWING

The present disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

DETAILED DESCRIPTION

Aspects of the disclosure include a standard cell semiconductor integrated circuit device, a method for forming the standard cell semiconductor integrated circuit device, a layout for a standard cell semiconductor integrated circuit device and a method for designing or formulating the layout. The method for designing the layout may be carried out by a CAD tool such as an APR, or other suitable design tools. Another aspect of the disclosure is a computer readable storage medium encoded with computer program code such that when the computer program code is executed by a processor, the processor performs a method for designing the layout of a standard cell semiconductor integrated circuit device. The processor may be included in an APR or other design tool that places and routes the cells of the semiconductor standard cell IC device, i.e. designs the layout, in accordance with the encoded instructions.

Embodiments of the disclosure will be described below in detail with reference to the accompanying drawings.

Figure 1:
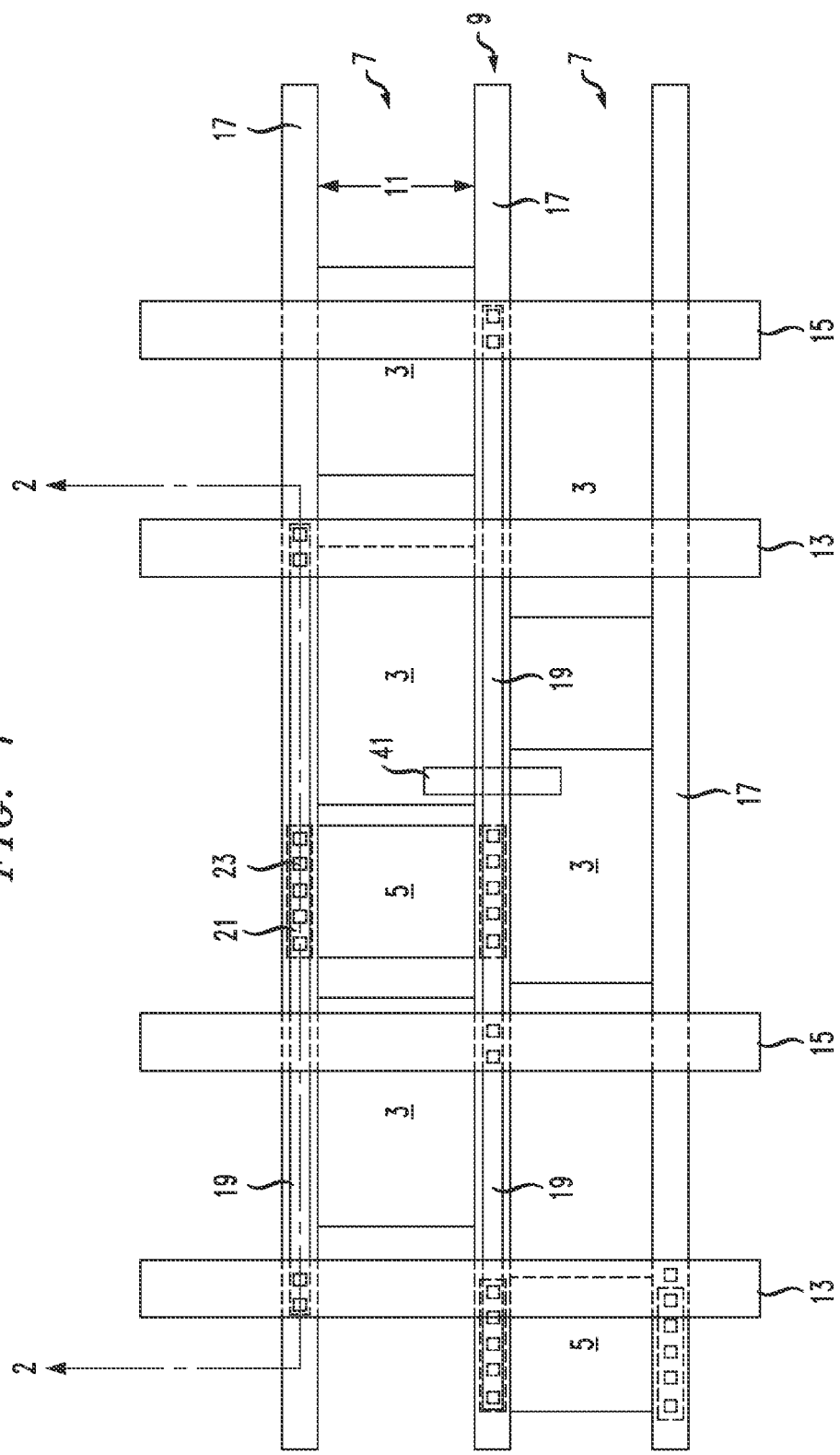
FIG. 1 is a plan view of a portion of a standard cell semiconductor device according to the disclosure.
Figure 2:
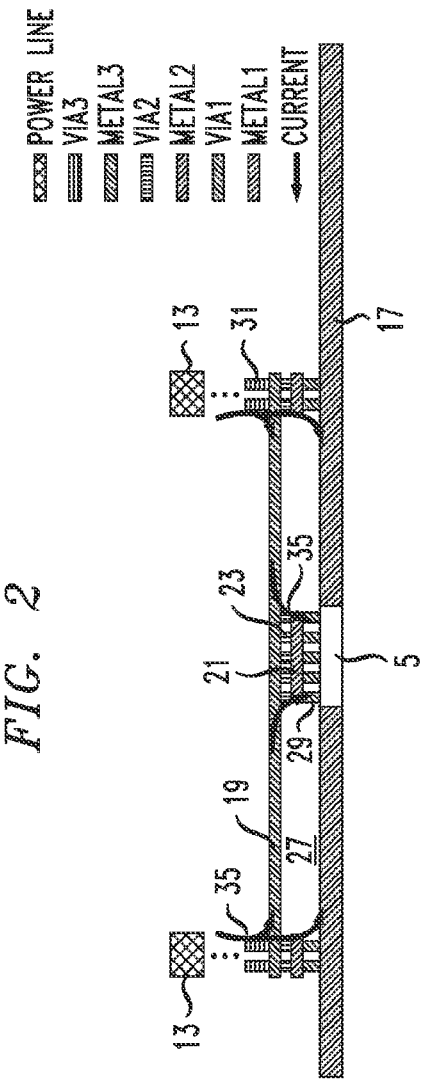
FIG. 2 is a cross-sectional view taken along line 2-2 of FIG. 1 and showing an exemplary portion of a standard cell semiconductor device according to the disclosure.

FIGS. 1 and 2 represent a plan view and cross-sectional view, respectively, of a portion of an exemplary standard cell semiconductor IC device according to an embodiment of the disclosure. FIG. 2 is a cross-section taken along line 2-2 of FIG. 1. FIGS. 1 and 2 can be considered to illustrate an exemplary layout of relevant portions of a standard cell IC device according to the disclosure, or to illustrate relevant portions of a fabricated standard cell IC device formed in accordance with design and layout aspects of the disclosure. Various conventional device features such as circuit details of the standard cells including first standard cells 3 and target standard cells 5 are not shown in order to more clearly illustrate the layout of the cells and the interconnect or routing wires in the standard cell semiconductor IC device according to the disclosure.

Referring to both FIGS. 1 and 2, the layout of the semiconductor standard cell device includes a plurality of standard cells including first standard cells 3 and target standard cells 5 arranged along substantially parallel rows 7 in the exemplary embodiment. First standard cells 3 and target standard cells 5 have substantially the same dimension 11 transverse to the direction of rows 7. Each first standard cell 3 may include a number of device structures such as group of transistors and interconnect structures that provide a boolean logic function (e.g., AND, OR, XOR, XNOR, inverters, etc.), a storage function (flipflop or latch, e.g.) or other suitable functions as known in the art. Various standard cells may be used that provide various logic functions. According to an aspect of the disclosure directed to designing the layout of the standard cell IC device, the first standard cells 3 may be stored in a library from which they may be selected and placed within rows 7 using conventional means, to form a standard cell semiconductor integrated circuit device.

Target standard cells 5 include substantially the same dimension 11 and are disposed along rows 7. Target standard cells 5 may be used in various arrangements and in various combinations with respect to first standard cells 3. Target standard cells 5 are standard cells that are user defined cells and may include operational characteristics different than the operational characteristics of the other first standard cells 3. Target standard cells 5 may be cells that are characterized by higher power consumption levels than first standard cells 3, according to one embodiment in which target standard cells 5 are therefore susceptible to leakage. According to an aspect of the disclosure directed to designing the layout of the standard cell IC device, target standard cells 5 may be identified by the user/customer and provided to the design tool using conventional input means.

According to one aspect of the disclosure, first standard cells 3 and target standard cells 5 may be stored in databases called netlists which may also include the routings, i.e. interconnections between the cells. The netlist may include first standard cells 3 selected from a standard cell library and target standard cells 5 identified, specified or input by a user to a design tool. The netlist may be used by a floor planner or placement tool such as an (APR) automatic placement and routing tool or other CAD tool, to place the desired first standard cells 3 and target standard cells 5 at particular locations in the layout for a standard cell semiconductor integrated circuit device such as shown in the illustrated exemplary embodiment. The netlist may also provide instructions to the design tool with respect to the routing between the cells also as shown in the illustrated embodiments. The APR or other design tool thus designs the layout of the standard cell semiconductor device according to the netlist.

The database and instructions to the floor planner, APR tool, router or other CAD tool may be provided in a computer readable storage medium encoded with computer program code such that when the computer program code is executed by a processor, the processor provides instructions to the floor planner, APR tool, router or other CAD tool to design the standard cell semiconductor integrated circuit device as described supra. In essence, the concepts of the layout set forth herein may be used to design a standard cell semiconductor IC device using any of various well-known integrated circuit design tools and means.

First standard cells 3 and target standard cells 5 may include transistors and other suitable semiconductor devices (not shown) formed of conventional materials and interconnect features also formed of conventional conductive materials.

Still referring to FIGS. 1 and 2, power lines 13 and ground lines 15 extend substantially orthogonal with respect to rows 7 but other orientations and arrangements may be used in other exemplary embodiments. As illustrated most clearly in FIG. 2, power lines 13 and ground lines 15 are situated above the other illustrated device features and may be electrically coupled to external sources, i.e. a power source and ground.

Lower power rail 17 may be formed of a lower conductive material and upper power rail 19 may be formed of an upper conductive material and interposed between the lower conductive material and upper conductive material is an optional intermediate conductive material 21 that forms routing interconnect 41 in the three-dimensional device layout. Routing interconnect 41 may route signals and alternatively be referred to as signal routing interconnect 41, especially in the context of device design, according to one exemplary embodiment. Lower power rail 17 and upper power rail 19 are conductive leads and each extend substantially linearly along the boundary 9 between adjacent rows 7 in the illustrated exemplary embodiment. Referring primarily to FIG. 2, target standard cell 5 is connected to power lines 13 by lower power rail 17 and upper power rail 19. Current, represented by arrows 35, flows both along lower power rail 17 and upper power rail 19 to target standard cell 5. This alleviates the problem which may otherwise be caused if only one power rail was used especially according to the embodiment in which target standard cell 5 operates at high power consumption levels. Target standard cell 5 is coupled to upper power rail 19 through lower vias 29, a segment of optional intermediate conductive material 21 and upper vias 23 but intermediate conductive material 21 is absent from other laterally spaced areas along boundary 9 and does not otherwise overlay lower power rail 17. This enables intermediate conductive layer 21 to serve as routing interconnect 41 shown in FIG. 1 that couples a first standard cell 3 from one row 7 to another first standard cell 3 in another row 7. Greater routing capability and levels of integration are achieved because the upper power rail 19 is disposed above intermediate conductive layer 21 enabling intermediate conductive layer 21 to provide lateral connection between such cells. The use of vias and the segment of intermediate conductive material 21 in coupling target standard cell 5 to upper power rail 19 and also the use of vias 31 in coupling lower power rail 17 and upper power rail 19 to power lines 13, is exemplary only. Other arrangements may be used to provide current flow between power lines 13 and target standard cell 5 along lower power rail 17 and upper power rail 19. According to one exemplary embodiment in which intermediate conductive layer 21 is not used, lower power rail 17 may be directly coupled to upper power rail 19 through vias.

According to an exemplary embodiment such as illustrated in FIG. 1, the upper power rail 19 is used only to connect target cells 5 to power lines 13 and ground lines 15, along with lower power rail 17. The upper power rails are not needed or utilized to couple first standard cells 3 to power lines 13 and/or ground lines 15.

According to one design aspect of the layout of the disclosure, lower power rail 17 may be formed of a lower metal layer and extends along boundary 9 between adjacent rows 7. Each standard cell, i.e. each first standard cell 3 and each target standard cell 5, is coupled to power lines 13 and ground lines 15 by lower power rail 17. Each target standard cell 5 is further coupled to power line 13 and ground line 15 by an upper power rail 19 which may be formed of an upper metal layer. Upper power rails 19 are not present in regions between power 13 and ground lines 15 that do not contain at least one target standard cell 5 such as exhibited by the bottom lower power rail 17 of the three lower power rails 17 illustrated in FIG. 1. According to this design aspect, the lower and upper metal layers may be successive metal layers or they may optionally have one or more intermediate metal layers disposed between them such as illustrated intermediate conductive material 21 which is optional and is not used in some design embodiments.

When a semiconductor device is formed according to the exemplary layout, the vias, and lower, intermediate and upper conductive layers may be formed of conventional conductive materials such as but not limited to aluminum, copper, alloys thereof and other suitable metals and alloys. The conductive materials are electrically isolated from one another by dielectric 27 shown in FIG. 2. The power lines 13 and ground lines 15, alternatively referred to as power wires and ground wires, respectively, may be formed of various suitable conductive materials. The dimensions and relative dimensions of such features will vary by design and conventional and known fabrication processes may be used for manufacturing the semiconductor standard cell IC device according to the design and layout aspects of the disclosure.

Figure 3:
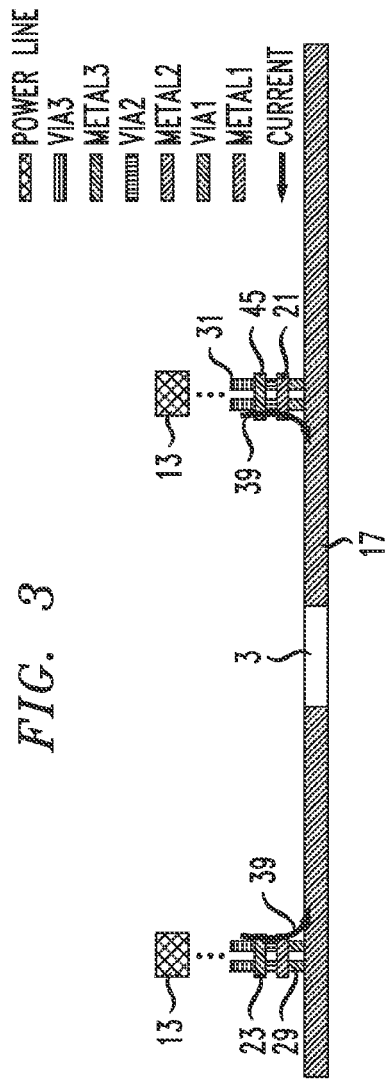
FIG. 3 is a cross-sectional view showing another exemplary portion of a standard cell semiconductor device according to the disclosure.

FIG. 3 shows first standard cell 3 coupled to power lines 13 without the use of upper power rail 19. Current, indicated by arrows 39, flows from power lines 13 through the stack of vias 31, 23, 29, the segment of intermediate conductive material 21 and the segment 45 of upper conductive material layer to first standard cell 3 through only lower power rail 17.

In the exemplary embodiment shown in FIG. 1, lower power rail 17 and upper power rail 19 are parallel, with upper power rail 19 overlaid directly over lower power rail 17.

Figure 4A:
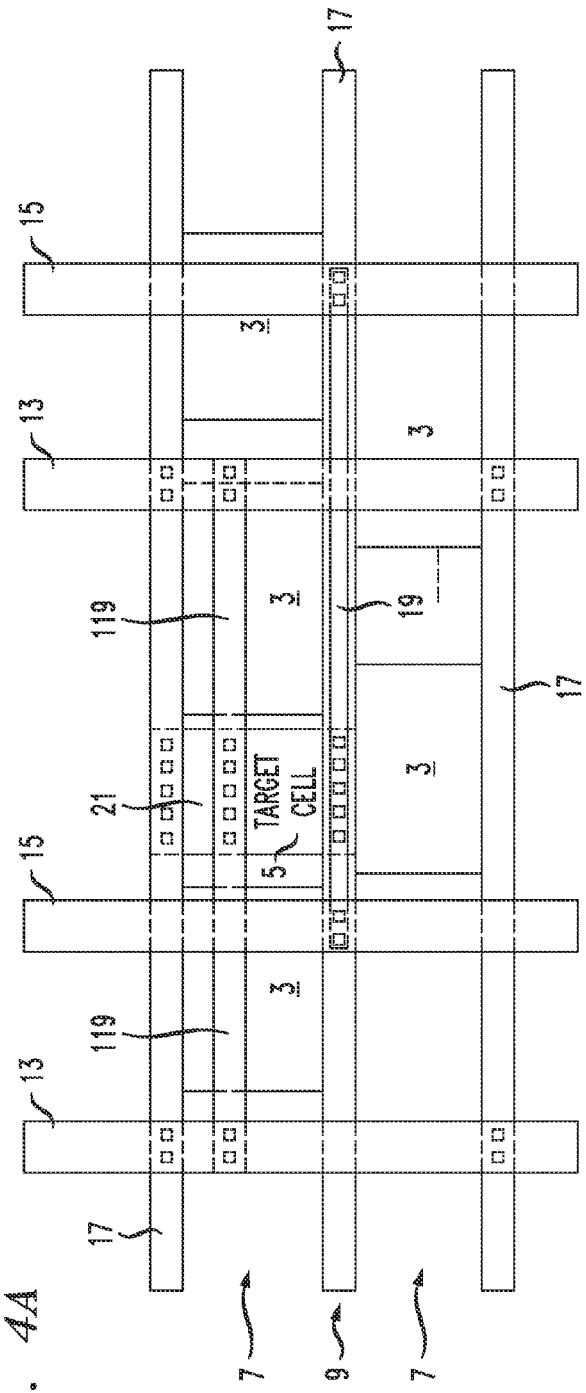
FIGS. 4A and 4B represent a top plan view, and a cross-sectional view, respectively, of another exemplary standard cell semiconductor device according to the disclosure.
Figure 4B:
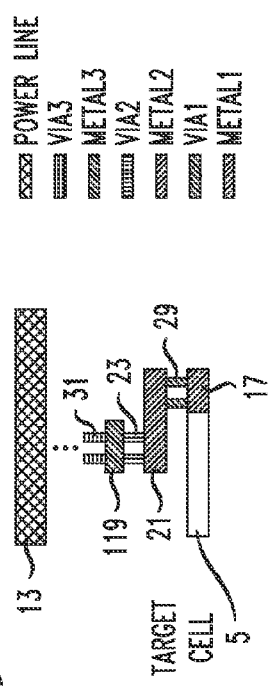

According to another exemplary embodiment shown in FIGS. 4A and 4B, upper power rail 119 is substantially parallel to lower power rail 17 but not overlaid directly over lower power rail 17. Upper power rail 19 is overlaid over the middle of the three illustrated lower power rails 17. In FIG. 4A, upper power rail 119 is disposed over target standard cell 5 and first standard cell 3, and extends within and along row 7 and not along boundary 9 between rows 7. FIG. 4B shows an exemplary cross-section showing upper power rail 119 disposed over target standard cell 5 and therefore not overlaid directly over lower power rail 17. Previously described vias 29, 23 and 31 couple target standard cell 5 to power line 13 also by way of a segment of intermediate conductive material 21. In other exemplary embodiments, the upper power rail need not be parallel to lower power rail 17 and may take on various shapes as it extends within row 7 and over one or more of the cells, i.e. over first standard cell 3 and/or target standard cell 5.

According to each of the described exemplary embodiments, it should be understood that additional wiring layers may be used, e.g. additional layers of conductive materials may be utilized. The additional layers may be interposed within the illustrated structures or disposed over the illustrated exemplary structures. It should be further noted that the dots indicating connection from the uppermost via to the associated power or ground line in the cross-sectional views, indicate that other conductive layers may be disposed between the power line and the illustrated via 31, to effectuate the connection.

Figure 5:
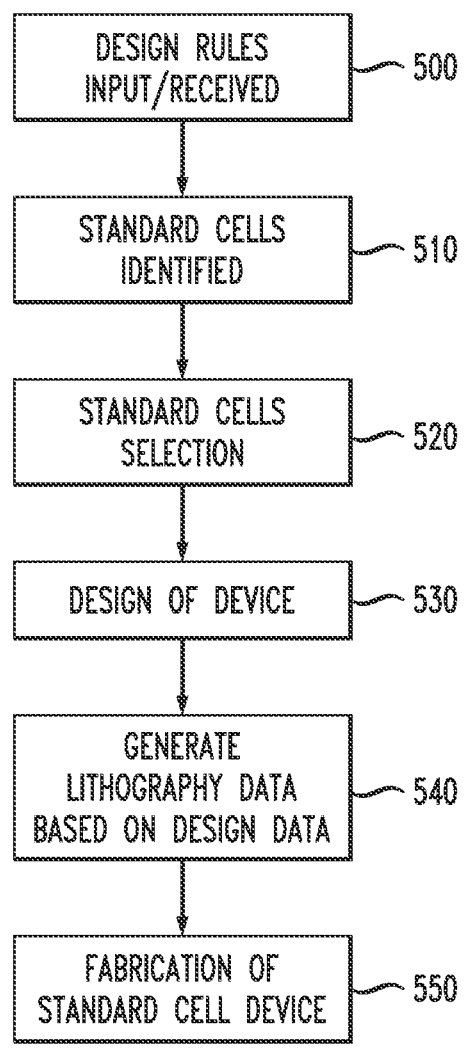
FIG. 5 is a flow chart showing an exemplary methodology of the disclosure.

FIG. 5 is a flowchart showing an exemplary methodology of the disclosure, such as has been described, supra. At step 500, design rules are received by or input to a computer-aided design (CAD) tool. Various suitable CAD tools may be used. The design rules may be generated by a further CAD system according to one embodiment and they may be stored on any of various suitable computer-readable storage media. At step 510, standard cells are identified. According to one exemplary embodiment, a user may identify specified standard target cells and input them to the CAD tool. Other standard cells may be identified based on design needs and function and application of the integrated circuit being designed. Various types of standard cells, such as described supra, may be identified. At step 520, standard cells are selected. According to one embodiment, various standard cells such as referred to previously as first standard cells may be selected from a library of standard cells such as may include a number of device structures such as a group of transistors and interconnect structures that provide a boolean logic function (e.g., AND, OR, XOR, XNOR, inverters, etc.) Additional standard cells that may have different operational characteristics such as higher power consumption levels than the other standard cells, and which may be designated target cells, are also selected. These target standard cells may be selected based on information provided by a user and which includes the user-specified target standard cells.

At step 530, the semiconductor integrated circuit or other device is designed, i.e. the layout of the semiconductor device is designed. The design is carried out using the first standard cells and the target standard cells and according to the design rules. The design may be carried out by various CAD tools such as by an APR tool and it may be carried out based on a netlist. The design may be carried out by a processor that is executing computer program code such as may be stored on any of various computer-readable storage media encoded with such computer program code. The design produces a layout for a standard cell semiconductor device as described supra. At step 540, lithography data is generated based on the design and a photomask set is produced. At step 550, the standard cell semiconductor device is fabricated using various processing technologies and the photomask set.

According to one aspect of the disclosure, a semiconductor integrated circuit is provided. The semiconductor integrated circuit comprises a plurality of standard cells having substantially the same size in at least one dimension and arranged in a plurality of substantially parallel rows. The standard cells include first standard cells, and target standard cells that operate at higher power consumption levels than the first standard cells. Power and ground wires are disposed over the standard cells. Lower conductive lines formed of a lower metal layer extend along respective boundaries between adjacent rows of the plurality of substantially parallel rows and couple each of the first standard cells to the power and ground wires. Upper conductive lines are formed of an upper metal layer. Each target standard cell is further coupled to the power and ground wires by at least one upper conductive line. Upper conductive lines are not present in regions between the power and ground wires that do not contain at least one target standard cell. The lower and upper metal layers are separated from one another by at least a dielectric.

The semiconductor integrated circuit may further comprise an intermediate metal layer interposed between the lower and upper metal layers and interconnecting at least one standard cell in one of the rows to a further standard cell of the standard cells, in another of the rows.

According to another aspect of the disclosure, a standard cell semiconductor device layout is provided. The layout comprises a plurality of standard cells having substantially the same size in at least one dimension and arranged in a plurality of substantially parallel rows, the standard cells comprising first standard cells, and target standard cells that operate at higher power consumption levels than the first standard cells. The layout also comprises power and ground wires extending over the standard cells, lower power rail lines of a lower device level and each extending along a respective boundary between adjacent rows of the plurality of substantially parallel rows and the lower power rail lines electrically coupling each of the standard cells to the power and ground wires. Upper power rail lines of an upper device level are provided. Each target standard cell is further electrically coupled to the power and ground wires by at least one upper power rail line. Upper power rail lines are not present in regions between the power and ground wires that do not contain at least one target standard cell.

According to another aspect of the disclosure, provided is a method for designing a standard cell semiconductor device layout. The method comprises selecting a plurality of standard cells having substantially the same size in at least one dimension. Selecting includes selecting first standard cells from a library and selecting identified target standard cells that operate at higher power consumption levels than the first standard cells. The method further comprises arranging the standard cells in a plurality of substantially parallel rows and placing power and ground wires over the standard cells. The method further comprises providing lower power rail lines of a lower device level and extending along respective boundaries between adjacent rows of the plurality of substantially parallel rows, the lower power rail lines electrically coupling each of the standard cells to the power and ground wires, and providing upper power rail lines of an upper device level. Each target standard cell is further electrically coupled to the power and ground wires by an upper power rail line, the upper power rail lines not present in regions between the power and ground wires that do not contain at least one target standard cell, wherein at least the lower power rail lines extend along a boundary between adjacent rows of the plurality of rows.

The method may further include the processor or design tool receiving an identification of the various cells to be included in the standard cell semiconductor device using conventional means.

According to another aspect of the disclosure, a computer readable storage medium is provided. The computer readable storage medium is encoded with computer program code, such that when the computer program code is executed by a processor, the processor performs a method for designing a standard cell semiconductor device layout, such as the method described supra. The processor may be included in a CAD tool.

The preceding merely illustrates principles of the disclosure. It will thus be appreciated that those skilled in the art will be able to devise various arrangements which, although not explicitly described or shown herein, embody principles of the disclosure and are included within its spirit and scope. Furthermore, all examples and conditional language recited herein are principally intended expressly to be only for pedagogical purposes and to aid the reader in understanding the principles of the disclosure and the concepts furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements or techniques developed that perform the same function.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the device be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the disclosure has been described in terms of exemplary embodiments, it is not limited thereto. Rather, the appended claims should be construed broadly, to include other variants and embodiments of the disclosure, which may be made by those skilled in the art without departing from the scope and range of equivalents of the disclosure.

What is claimed is:

1. A semiconductor integrated circuit comprising:
a plurality of cells arranged in a plurality of rows;
said cells comprising first cells and target cells that operate with different operational characteristics than said first cells;
first power wires and second power wires disposed over said cells;
first conductive lines extending along said plurality of rows and coupling each of said cells to said first power wires and said second power wires; and
second conductive lines, each said target cell further coupled to said first power wires and said second power wires by at least one said second conductive line, said second conductive lines not present in regions that are between said first power wires and said second power wires and that do not contain at least one said target cell.

2. The semiconductor integrated circuit as in claim 1, wherein said cells comprise standard cells, said first conductive lines are lower conductive lines, said second conductive lines are upper conductive lines, each said upper conductive line is aligned over a corresponding lower conductive line and said upper conductive lines and said lower conductive lines extend substantially in a linear direction.

3. The semiconductor integrated circuit as in claim 2, further comprising an intermediate metal layer interposed between a lower metal layer including said lower conductive lines and an upper metal layer including said upper conductive lines, said intermediate metal layer providing signal routing between at least one said standard cell in one of said rows and a further standard cell of said standard cells, in another row of said plurality of rows.

4. The semiconductor integrated circuit as in claim 2, wherein at least one of said upper conductive lines is disposed within one of said rows.

5. The semiconductor integrated circuit as in claim 2, wherein said lower conductive lines extend along respective boundaries between adjacent rows of said plurality of rows.

6. The semiconductor integrated circuit as in claim 5, further comprising at least one further said upper conductive line disposed parallel to said lower conductive lines and disposed within one of said rows.

7. The semiconductor integrated circuit as in claim 1, wherein said target cells operate at higher power consumption levels than said first cells.

8. The semiconductor integrated circuit as in claim 7, wherein said first conductive lines and said second conductive lines are substantially parallel and said first power wires and said second power wires extend substantially orthogonally with respect to said rows.

9. The semiconductor integrated circuit as in claim 1, wherein said cells comprise standard cells and have substantially the same size in at least one dimension.

10. The semiconductor integrated circuit as in claim 1, wherein said first conductive lines are lower conductive lines and said second conductive lines are upper conductive lines and are separated from said lower conductive lines by a dielectric, and said second power wires are ground wires.

11. A semiconductor device layout comprising:
a plurality of cells arranged in a plurality of rows;
said cells comprising first cells and target cells that operate with different operational characteristics than said first cells;
first power wires and second power wires extending over said cells;
first power rail lines of a first device level and each extending along said plurality of rows and said first power rail lines electrically coupling each of said cells to said first power and said second power wires; and
second power rail lines of a second device level, each said target cell further electrically coupled to said first power and said second power wires by at least one said second power rail line, said second power rail lines not present in regions that are between said first power wires and said second power wires and that do not contain at least one said target cell.

12. The semiconductor device layout as in claim 11, wherein said first power rail lines are lower power rail lines that are parallel to said second power rail lines which are upper power rail lines.

13. The semiconductor device layout as in claim 12, wherein each said upper power rail line is overlaid directly over one of said lower power rail lines.

14. The semiconductor device layout as in claim 13, wherein said lower power rail lines extend along respective boundaries between adjacent rows of said plurality of rows.

15. The semiconductor device layout as in claim 12, wherein at least one of said upper power rail lines extends over at least one of said target cells and said first cells.

16. The semiconductor integrated circuit as in claim 12, wherein at least one of said upper power rail lines extends over at least one of said target cells and said first cells.

17. The semiconductor device layout as in claim 11, wherein said cells are standard cells and have substantially the same size in at least one dimension and said second power wires are ground wires.

18. The semiconductor device layout as in claim 11, further comprising a third device level interposed between said first and second device levels and providing signal routing between at least one said cell in one of said rows and a further cell of said cells, in another row of said plurality of rows.

19. The semiconductor device layout as in claim 18, wherein said second power rail lines are coupled to said first device level through said third device level and vias, said first power rail lines extend substantially linearly, and said second power wires comprise ground wires.

20. The semiconductor device layout as in claim 11, wherein said plurality of rows are substantially parallel and said first power wires and said second power wires extend substantially orthogonally with respect to said rows.

* * * * *